(12) United States Patent
Winick et al.

(10) Patent No.: US 8,596,375 B2
(45) Date of Patent: Dec. 3, 2013

(54) FINGER WHEEL ROW CLEANER

(76) Inventors: Alan E. Winick, Wellington, CO (US);
Jerry L. Groff, Imperial, NE (US)

( * ) Notice: Subject to any disclaimer, the term of this patent is extended or adjusted under 35 U.S.C. 154(b) by 115 days.

(21) Appl. No.: 12/492,239

(22) Filed: Jun. 26, 2009

(65) Prior Publication Data

US 2009/0321096 A1    Dec. 31, 2009

Related U.S. Application Data

(60) Provisional application No. 61/076,295, filed on Jun. 27, 2008.

(51) Int. Cl.
*A01B 21/08* (2006.01)

(52) U.S. Cl.
USPC .............. 172/604; 172/540; 111/140

(58) Field of Classification Search
USPC ......... 172/574, 575, 603, 604, 173, 177, 518, 172/540, 584; 111/139, 140, 144, 164, 165, 111/166, 167, 191, 192, 193
See application file for complete search history.

(56) References Cited

U.S. PATENT DOCUMENTS

| | | | |
|---|---|---|---|
| 202,624 A | 4/1878 | Augspurger | |
| 355,405 A | 1/1887 | Lillie | |
| 1,699,151 A | 1/1929 | Miller et al. | |
| 1,884,720 A | 10/1932 | Karl | |
| 2,575,321 A | 11/1951 | Traver | |
| 2,596,527 A | 5/1952 | Bushong | |
| 2,691,933 A | 10/1954 | Emerson | |
| 2,715,882 A | 8/1955 | Overstreet, Jr. | |
| 3,621,922 A | 11/1971 | Hinken | |
| 3,766,988 A | 10/1973 | Whitesides | |
| 4,047,576 A | 9/1977 | Rau et al. | |
| 4,202,414 A | 5/1980 | von Braucke et al. | |
| 4,425,973 A * | 1/1984 | Williams et al. | 172/574 |
| 4,785,890 A | 11/1988 | Martin | |
| 5,129,282 A * | 7/1992 | Bassett et al. | 74/529 |
| 5,299,647 A | 4/1994 | Mudd et al. | |
| 5,346,020 A * | 9/1994 | Bassett | 172/540 |
| 5,461,995 A * | 10/1995 | Winterton | 111/139 |
| 5,477,792 A | 12/1995 | Basset et al. | |
| 5,479,868 A * | 1/1996 | Bassett | 111/139 |
| 5,497,717 A | 3/1996 | Martin | |
| 5,497,836 A * | 3/1996 | Groff | 172/555 |
| 5,620,055 A | 4/1997 | Javerlhac | |
| 5,657,707 A | 8/1997 | Dresher et al. | |
| 5,704,430 A | 1/1998 | Smith et al. | |
| 5,896,932 A | 4/1999 | Bruns et al. | |
| 6,279,666 B1 * | 8/2001 | Nikkel et al. | 172/574 |
| 6,776,107 B1 | 8/2004 | Shoup | |
| 7,240,627 B1 | 7/2007 | Whalen et al. | |

* cited by examiner

*Primary Examiner* — Matthew D Troutman
(74) *Attorney, Agent, or Firm* — Ancel W. Lewis, Jr.

(57) ABSTRACT

A row cleaner includes a wheel mount, a pair of hubs on the wheel mount and a finger wheel on each hub. The hubs are offset relative to each other in the direction of travel, and angled downwardly and inwardly. The finger wheels are concave and have equally spaced fingers. Each finger has three straight edges at selected angles to provide tapering fingers with a specific shape.

6 Claims, 5 Drawing Sheets

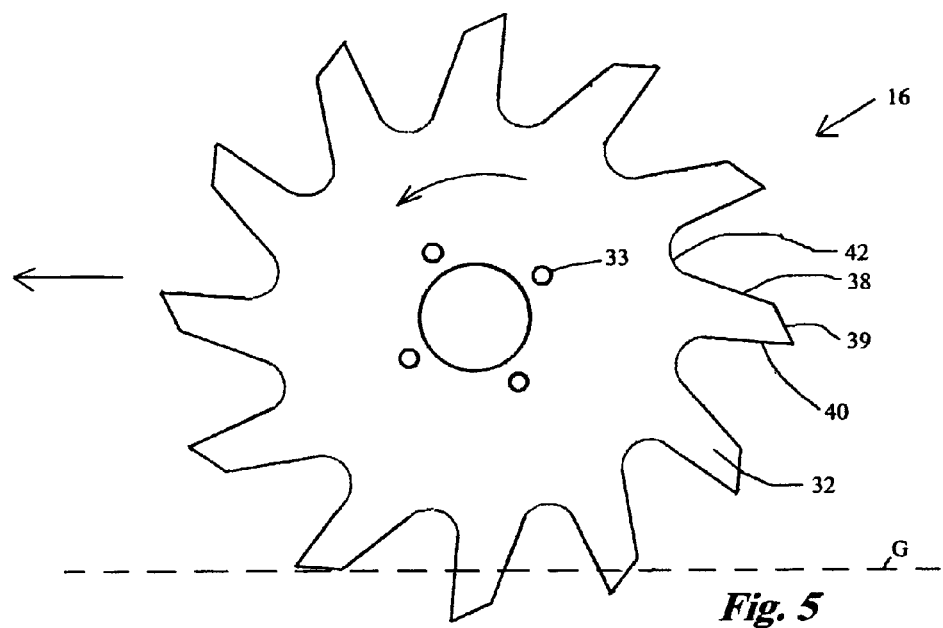
*Fig. 5*
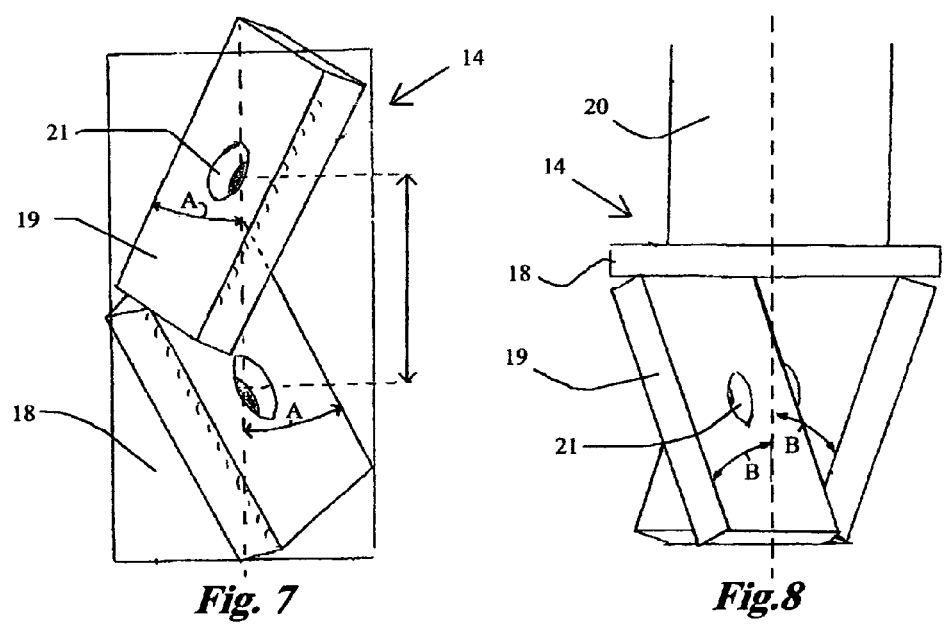
*Fig. 7*  *Fig. 8*

FINGER WHEEL ROW CLEANER

This application claims the benefit under 35 U.S.C. §119 (e) of the U.S. provisional patent application No. 61/076,295 filed Jun. 27, 2008, for the disclosure set forth therein.

TECHNICAL FIELD

The present invention relates to agricultural equipment, and more particularly to a row cleaner with offset and angled finger wheels.

BACKGROUND ART

Row cleaners clean the row line in front of fertilizing and/or planting apparatus. U.S. Pat. No. 5,497,836 to Groff discloses a row cleaner with finger wheels. U.S. Pat. No. 6,279,666 to Nikkel discloses a row cleaner having finger wheels that are spaced between three and ten inches along the direction of travel.

DISCLOSURE OF THE INVENTION

A row cleaner includes a wheel mount, a pair of hubs mounted on the wheel mount and a finger wheel mounted on each hub. The hubs are offset relative to each other in the direction of travel, and angled downwardly and inwardly. The finger wheels are concave and have a plurality of equally spaced fingers. Each finger has a first edge at a selected first angle to a radius of the finger wheel, a second edge at a selected second angle relative to the first edge, and a third edge at a selected third angle relative to the second edge.

BRIEF DESCRIPTION OF THE DRAWINGS

Details of this invention are described in connection with the accompanying drawings that bear similar reference numerals in which:

FIG. 5 is a schematic side elevation view of a finger wheel of the row cleaner of FIG. 1.
FIG. 7 is a schematic top plan view of the wheel mount of the row cleaner of FIG. 1.
FIG. 8 is a schematic rear elevation view of the wheel mount of the row cleaner of FIG. 1.

DETAILED DESCRIPTION OF THE INVENTION

Figure 1:
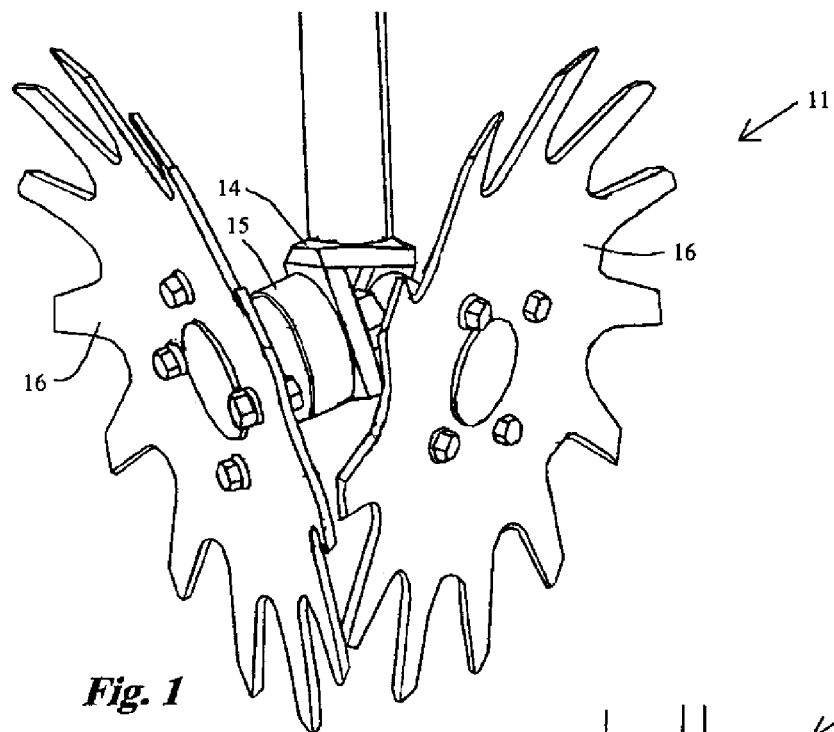
FIG. 1 is a front elevation view of a row cleaner embodying features of the present invention.
Figure 2:
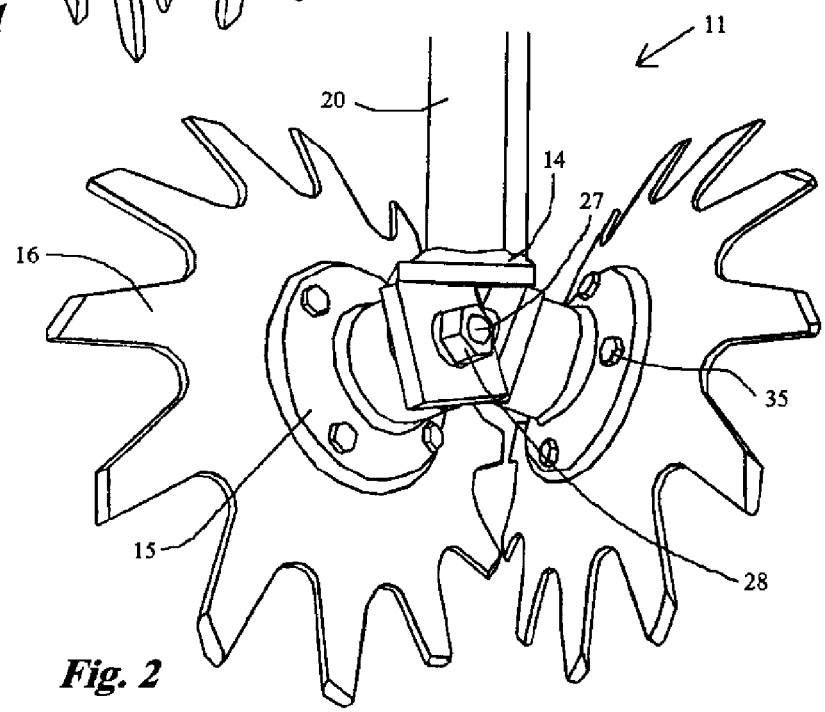
FIG. 2 is a rear elevation view of the row cleaner of FIG. 1.
Figure 3:
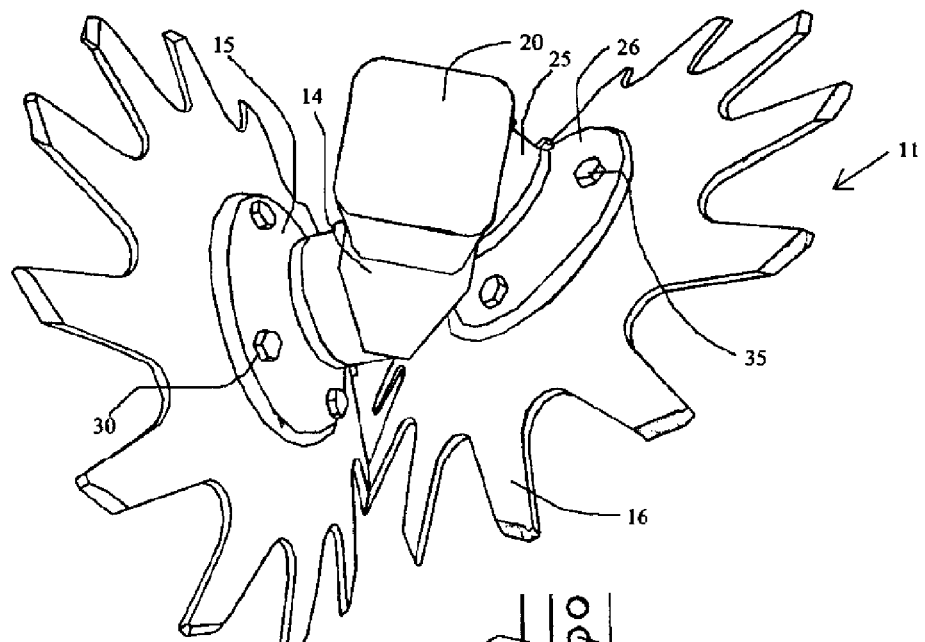
FIG. 3 is a top plan view of the row cleaner of FIG. 1.

Referring now to FIGS. 1 to 4, a row cleaner 11 embodying feature of the present invention includes a wheel mount 14, two hubs 15 and two finger wheels 16. The wheel mount 14 has a base 18, two hub plates 19 and a mounting tube 20. The base 18 is a horizontal, preferably steel, plate.

Describing the specific embodiments herein chosen for illustrating the invention, certain terminology is used which will be recognized as being employed for convenience and having no limiting significance. For example, the terms "front", "back", "up", and "down" will refer to the illustrated embodiment in its normal position of use. Further, all of the terminology above-defined includes derivatives of the word specifically mentioned and words of similar import.

The hub plates 19 are preferably of steel. As best seen in FIGS. 7 and 8 each hub plate 19 is rectangular in shape. A hub aperture 21 extends through each hub plate 19. The hub plates 19 are attached, preferably by welding, to the bottom of the base 18. The hub plates 19 are offset or spaced along the direction of travel of the row cleaner 11 a selected distance. In the illustrated embodiments of the row cleaner 11 the right hub plate 19 is in front of the left hub plate 19. Alternatively the left hub plate 19 can be in front of the right hub plate 19.

The hub plates 19 are angled inwardly and forwardly from a straight ahead, parallel spaced position at a selected skew angle A as seen in FIG. 7 and inwardly and downwardly relative to vertical at a selected tilt angle B as seen from the view in FIG. 8. Further the plates are longitudinally offset at a selected distance d as seen in FIG. 7. By way of examples and not as limitations, in the embodiment shown, skew angle A is 26 degrees for a total angle between disks of 52 degrees, tilt angle B is 18 degrees for a total angle between disks of 36 degrees and d is about 2½ inches. Referring again to FIGS. 1 to 4, the mounting tube 20 is preferably steel square tubing and is attached, preferably by welding, to the top of the base 18, projecting upwardly therefrom. A plurality of spaced mounting apertures 23 in the sides of the mounting tube 20 provide height adjustment when the row cleaner 11 is mounted on a farm implement.

Each hub 15 has a bearing 25 and a flange 26 attached to the bearing 25. A hub bolt 27 extends through each hub 15 and a hub aperture 21 in hub plate 19. A hub nut 28 on the hub bolt 27 secures the hub 15 to the hub plate 19. The flange 26 is spaced from the hub plate 19 by the bearing 25. A plurality of spaced wheel apertures 30, in a circular pattern, extend through the flange 26.

The finger wheels 16 are circular and concave. Each finger wheel 16 has a plurality of equally spaced, radially projecting fingers 32 and a plurality of spaced wheel apertures 33 that are positioned to align with the wheel apertures 30 on the flange 26 of the hub 15. Wheel bolts 35 extend through the wheel apertures 30 and 33 of the flange 26 and the finger wheel 16. Wheel nuts 36 on the wheel bolts 35 secure the finger wheels 16 to the hubs 15. Generally the finger wheels 16 will be from 12" to 14" in diameter.

Figure 6:
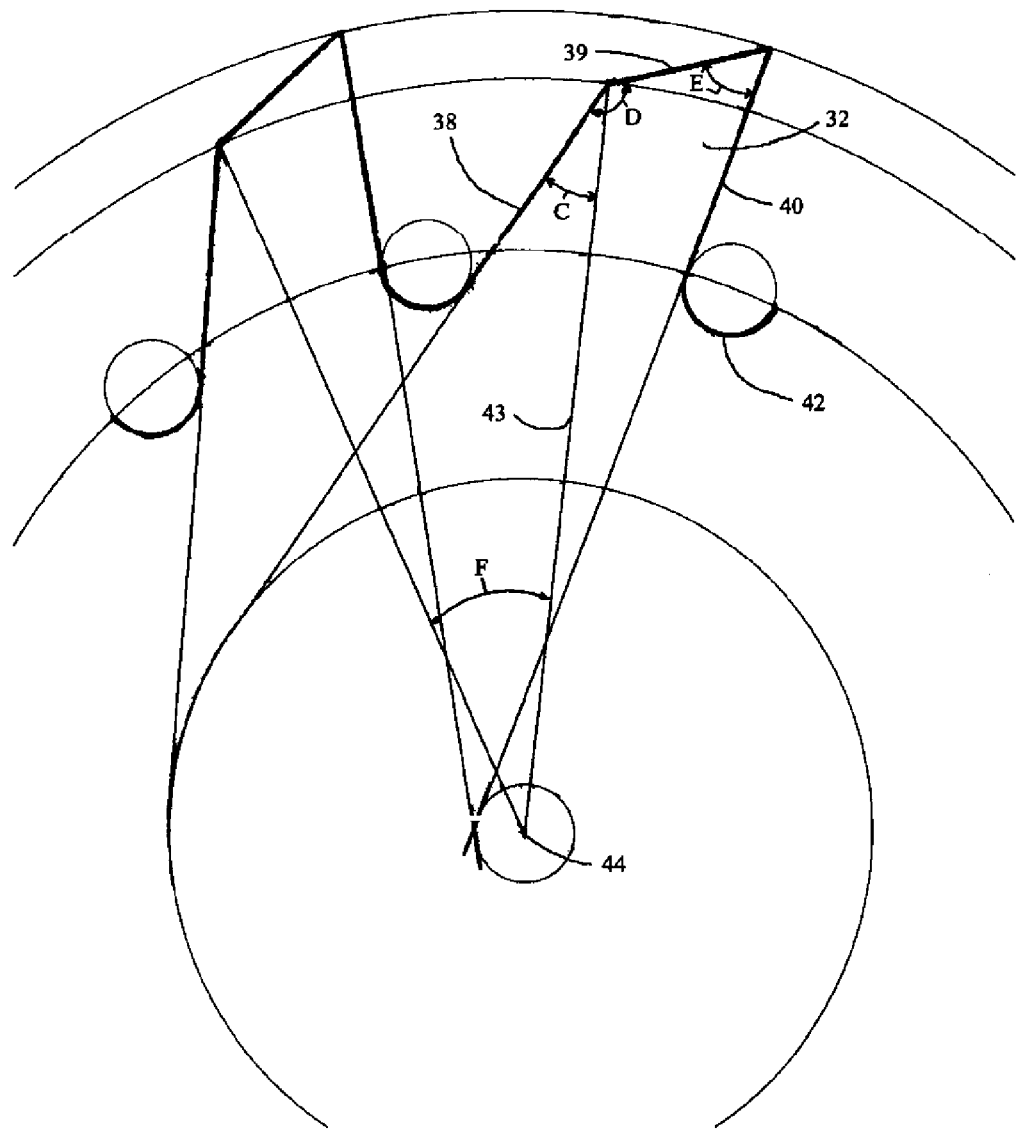
FIG. 6 is an enlarged, partial side elevation view of FIG. 5.

Each finger 32, as shown in FIGS. 5 and 6, has a peripheral first edge 38, a peripheral second edge 39 connected to the first edge 38 and a peripheral third edge 40 connected to second edge 39. The first, second and third edges 38, 39 and 40 are substantially straight. A curved connecting section 42 connects the third edge 40 of one finger 32 with the first edge 38 of the next finger 32.

The first edge 38 is forwardly facing, when the finger 32 is pointing upwardly, as shown in FIG. 6, and is at a first angle C to a radius 43 from the center 44 of the finger wheel 16 to the outer end of the first edge 38. The second edge 39 extends upwardly and rearwardly from the first edge 38 at an obtuse, selected second angle D relative to the first edge 38. The third edge 40 extends downwardly from the second edge 39 at an acute, selected third angle E relative to the second edge 39. The sum of the second and third angles D and E is greater than 180 degrees, so the fingers taper radially outwardly.

Twelve fingers 32 are shown in the illustrated embodiment with the first edges 38 of successive fingers 32 being separated by a selected angle F shown as about 30 degrees. Other numbers of fingers 32 can be used and the angle between the radii 43 through the second angle D of successive fingers 32 is 360 degrees divided by the number of fingers 32. In the illustrated embodiment the first angle designated C is about 28 degrees, the second angle designated D is about 137 degrees and the third angle designated E is about 58 degrees. The first angle C can be between 20 and 40 degrees, the second angle D can be between 100 and 180 degrees, and the third angle E can be between 45 and 90 degrees.

By way of examples, and not as limitations, the finger wheel 32 can have a radius of 7". The first and second edges 38 and 39 can intersect on a circle with a radius of 6.4" from the center 44. The first edge 38 can be on a tangent of a circle with a radius of 3" from the center 44. The third edge 40 can be on a tangent of a circle with a radius of 0.8" from the center 44. The connecting section 42 can be a circular arc with a diameter of 0.8" with the center of the arc being on a circle with a radius of 4.95" from the center 44.

Figure 9:
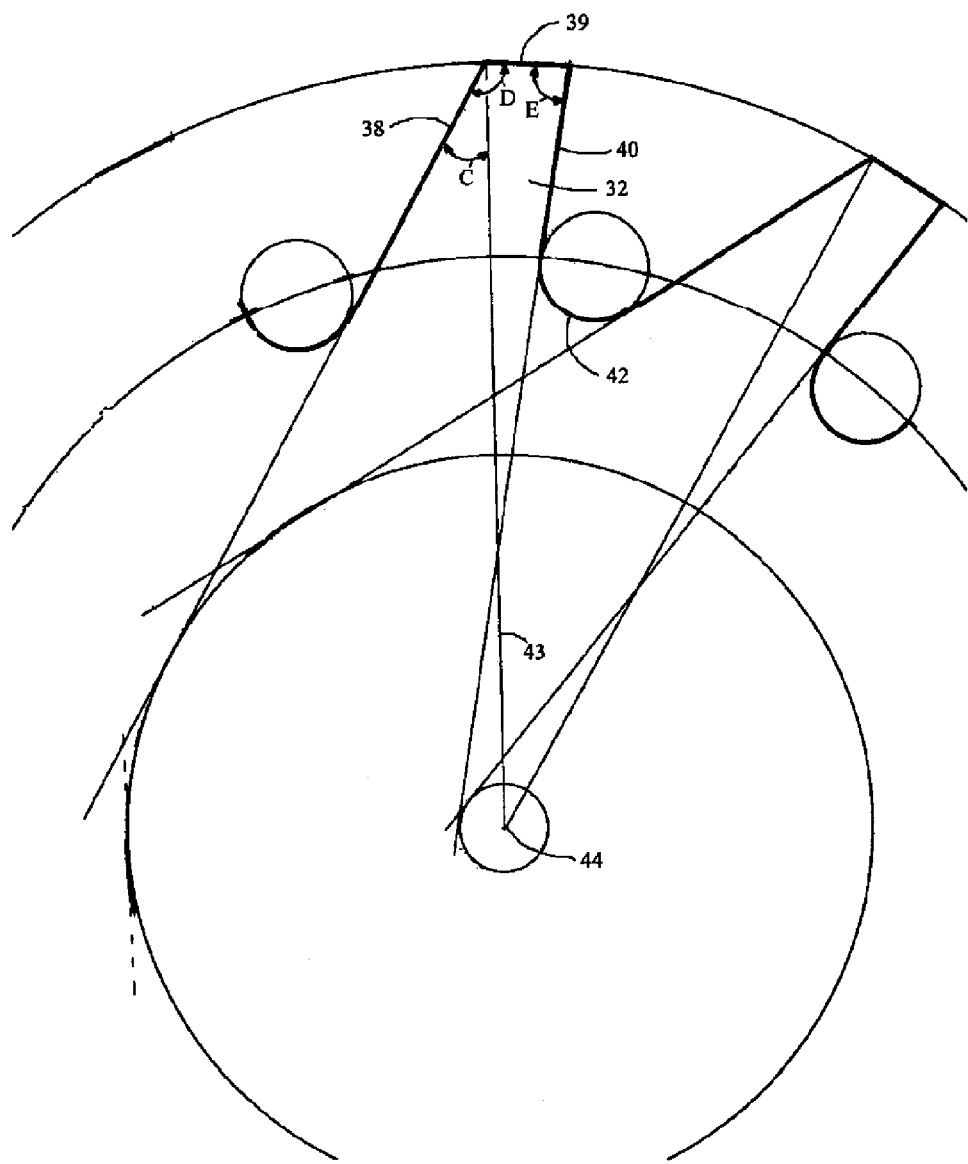
FIG. 9 is an enlarged, partial side elevation view of FIG. 5, with a modified finger configuration.

FIG. 9 shows a modified configuration of the fingers 32 on the finger wheel 16, for a shallower operating depth, providing more aggressive residue clearing with little cutting and lower soil disturbance. The fingers 32 shown have the first edge 38 at a first angle C to a radius 43 from the center 44 of the finger wheel 16 to the outer end of the first edge 38. The second edge 39 extends rearwardly from the first edge 38 at an obtuse, selected second angle D relative to the first edge 38, substantially on a tangent to the circumference of the finger wheel 16. The third edge 40 extends downwardly from the second edge 39 at an acute, selected third angle E relative to the second edge 39. The sum of the second and third angles D and E is greater than 180 degrees, so the fingers taper radially outwardly.

In the illustrated embodiment the first angle designated C is about 29 degrees, the second angle designated D is about 119 degrees and the third angle designated E is about 82 degrees. The first angle C can be between 20 and 40 degrees, the second angle D can be between 110 and 160 degrees, and the third angle E can be between 45 and 90 degrees.

By way of examples, and not as limitations, the finger wheel 32 can have a radius of 6.5". The first edge 38 can be on a tangent of a circle with a radius of 3.2" from the center 44. The third edge 40 can be on a tangent of a circle with a radius of 0.8" from the center 44. The connecting section 42 can be a circular arc with a diameter of 0.9" with the center of the arc being on a circle with a radius of 4.75" from the center 44.

The row cleaner 11 is adjusted in elevation so that as the cleaner is moved through the soil, the second edge 39 of a finger 32 is generally parallel to the ground surface, indicated by dashed line designated G in FIG. 5, when that finger 32 first contacts the soil. For each finger 32, the first edge 38 exits the soil first, the second edge 39 exits the soil second, and the third edge 40 is the last edge to leave the soil.

Figure 4:
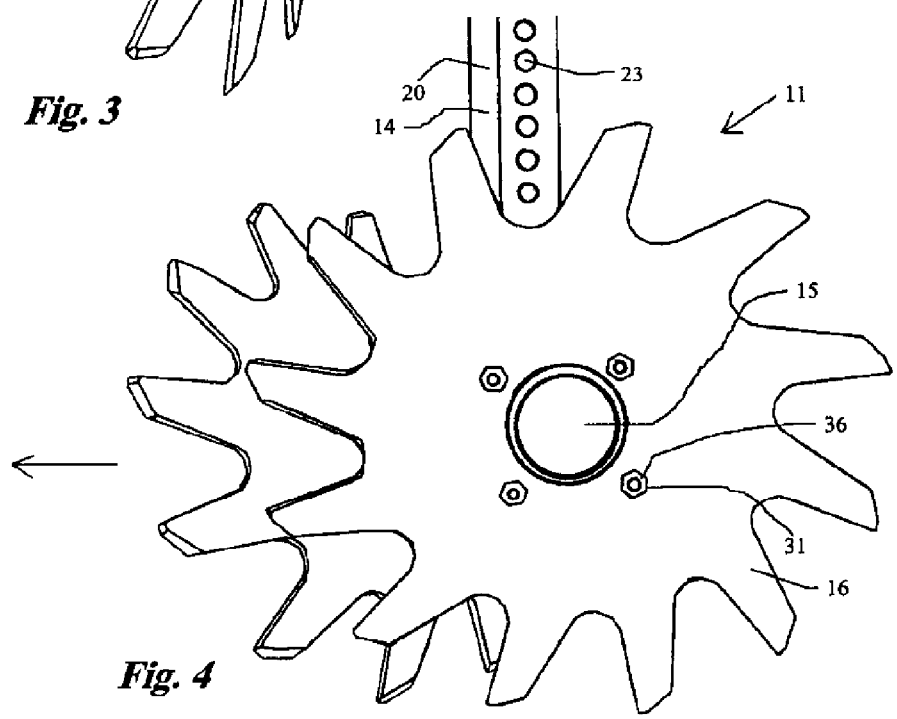
FIG. 4 is a side elevation view of the row cleaner of FIG. 1.

Further, as the row cleaner 11 is moved through the soil and the finger wheels 16 rotate as shown in FIGS. 4 and 5, the fingers 32 of the two finger wheels 16 engage the soil in sequence so that one finger 32 from one finger wheel 16 goes into the soil and then one finger 32 from the other finger wheel 16 goes into the soil to clear trash out of the way of the row planter.

Although the present invention has been described with a certain degree of particularity, it is understood that the present disclosure has been made by way of example and that changes in details of structure may be made without departing from the spirit thereof.

What is claimed is:

1. A row cleaner for cleaning a row in the soil, comprising:
   a wheel mount,
   a spaced pair of hubs mounted on said wheel mount, and
   a finger wheel rotatably mounted on each said hub, said finger wheels each having a plurality of spaced, elongated, radially projecting fingers, said fingers each having a straight first edge at a first angle of about 28 degrees to a radius from the center of said finger wheel to the outer end of said first edge, a straight second edge extending from said first edge at a second angle of about 137 degrees, and a straight third edge extending at a third angle of about 58 degrees from said second edge, with said first edge facing forwardly and said second edge facing upwardly when said finger is pointing upwardly and with the sum of said second and third angles being greater than 180 degrees,
   whereby said finger tapers radially outwardly, and said first edge contacts the soil first.

2. The row cleaner as set forth in claim 1 wherein said finger wheels are concave, and said hubs tilt inwardly, downwardly relative to vertical at a selected tilt angle opposite each other.

3. A row cleaner for cleaning a row in the soil, comprising:
   a wheel mount,
   a spaced pair of hubs mounted on said wheel mount, said hubs tilting inwardly, downwardly relative to vertical at a selected tilt angle opposite each other, said hubs angling inwardly, forwardly at a selected skew angle opposite each other, and said hubs being longitudinally offset at a selected distance, and
   a concave finger wheel rotatably mounted on each said hub, said finger wheels each having a plurality of spaced, elongated, radially projecting fingers, said fingers each having a straight first edge at a first angle of about 28 degrees to a radius from the center of said finger wheel to the outer end of said first edge, a straight second edge extending from said first edge at a second angle of about 137 degrees, and a straight third edge extending at a third angle of about 58 degrees from said second edge, with said first edge facing forwardly and said second edge facing upwardly when said finger is pointing upwardly and with the sum of said second and third angles being greater than 180 degrees,
   whereby said finger tapers radially outwardly, and said first edge contacts the soil first.

4. A circular, concave finger wheel for rotatably mounting on a hub of a wheel mount of a row cleaner, for cleaning a row in the soil, comprising:
   a plurality of spaced wheel apertures that are positioned to align with wheel apertures on said hub, and a plurality of spaced, elongated, radially projecting fingers, said fingers each having a straight first edge at a first angle of about 28 degrees to a radius from the center of said finger wheel to the outer end of said first edge, a straight second edge extending from said first edge at a second angle of about 137 degrees, and a straight third edge extending at a third angle of about 57 degrees from said second edge, with said first edge facing forwardly and said second edge facing upwardly when said finger is pointing upwardly and with the sum of said second and third angles being greater than 180 degrees.

5. The finger wheel as set forth in claim 4 wherein said second edge faces upwardly and forwardly when said finger is pointing upwardly.

6. The finger wheel as set forth in claim 4 wherein said second angle is more than 90 degrees greater than said first angle.

* * * * *